Patented Oct. 10, 1939

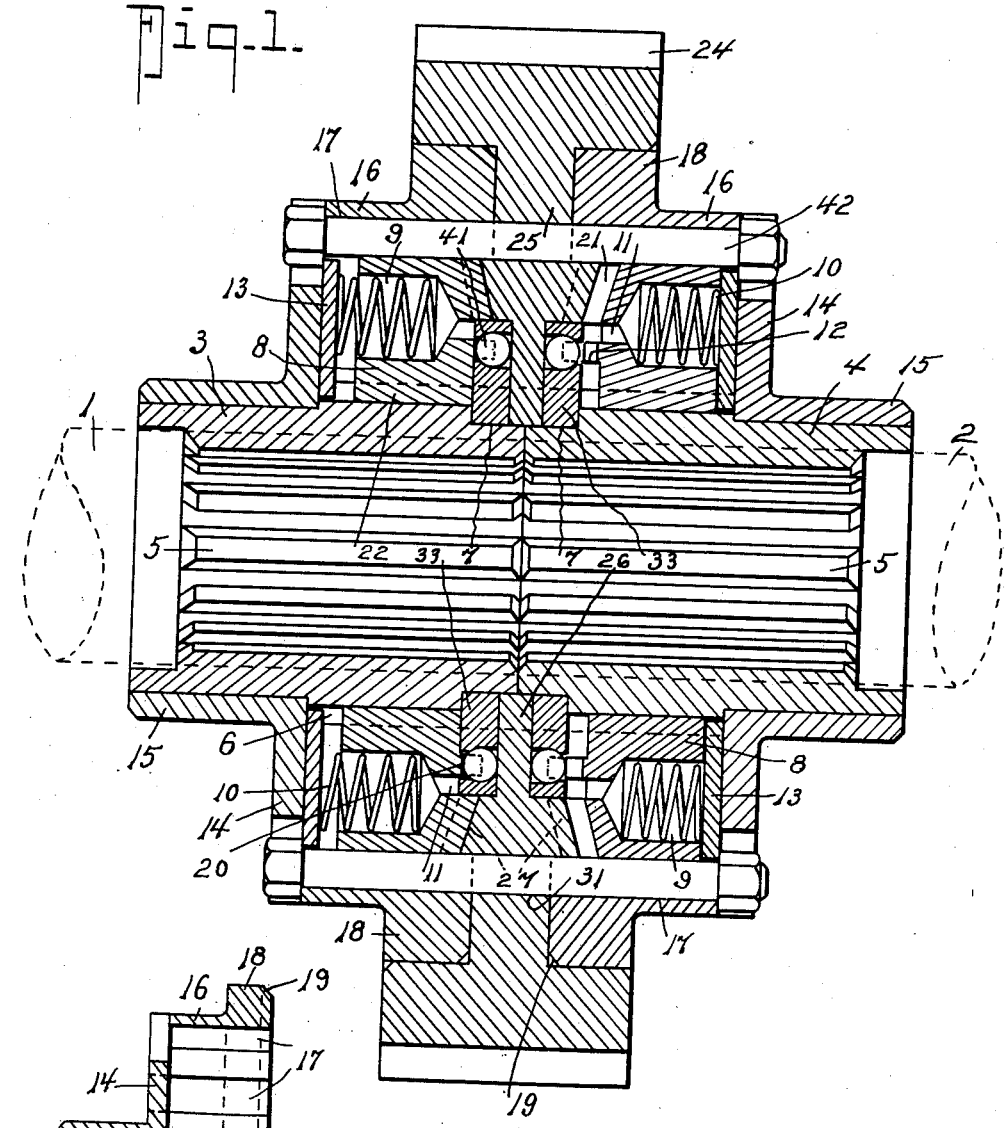

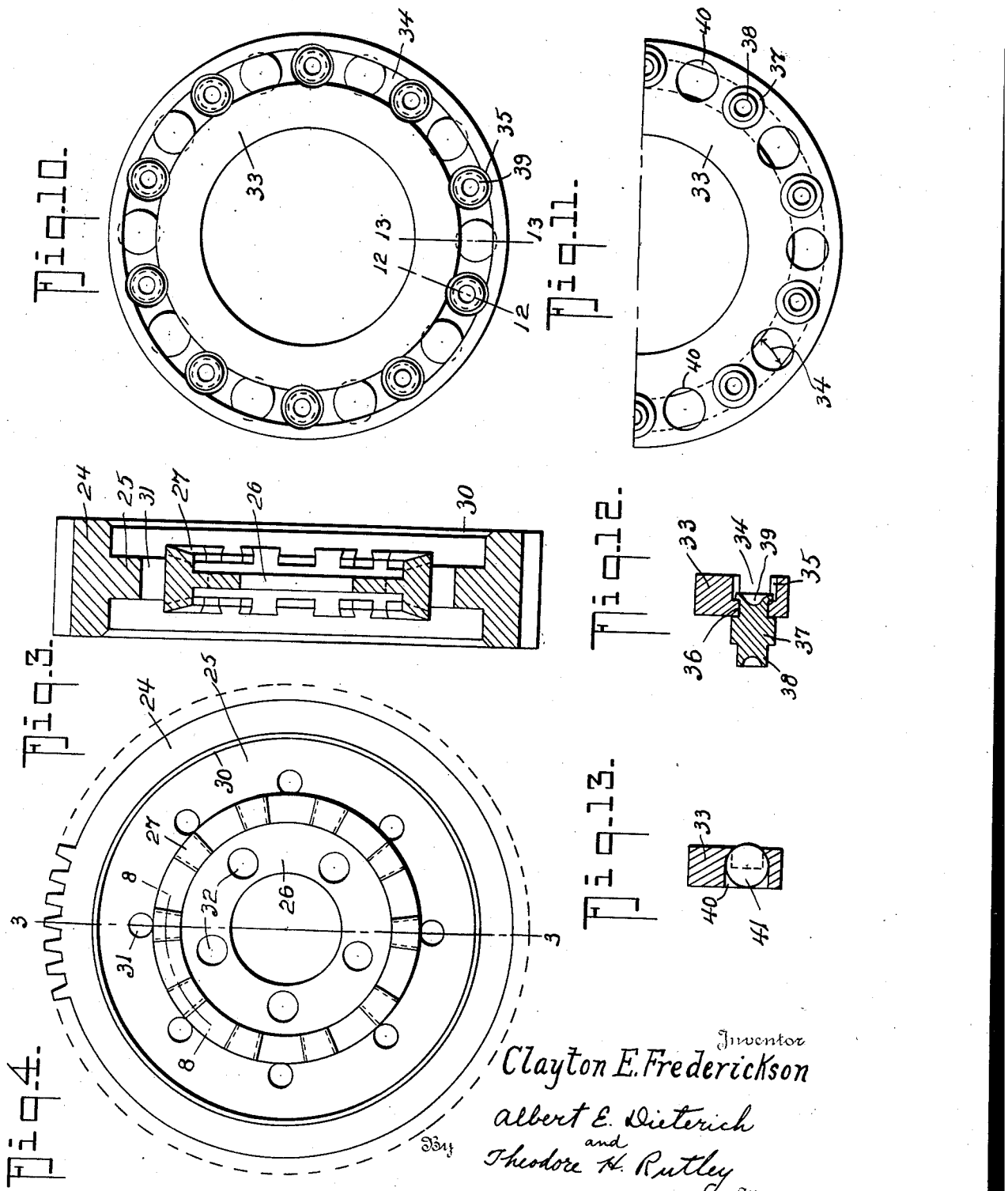

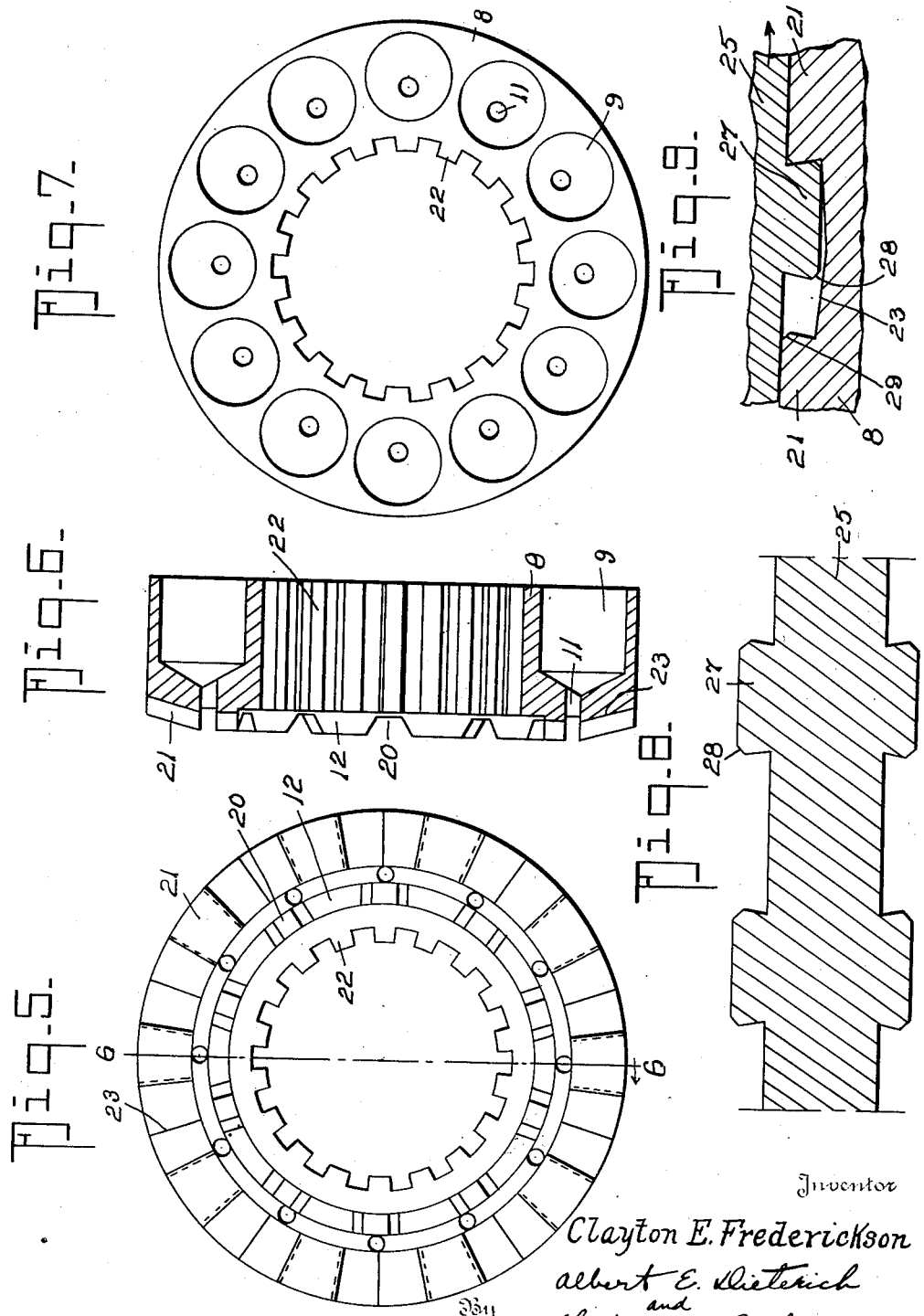

2,175,520

UNITED STATES PATENT OFFICE 2,175,520

DIFFERENTIAL MECHANISM

Clayton Erasmus Frederickson, Chicago, Ill.

Application July 29, 1938, Serial No. 222,036

4 Claims. (Cl. 74—389.5)

My invention relates to the art of wheeled motor vehicles and particularly to that part of the vehicle known as the "differential". Differentials may generally be classed in two types: the geared and the gearless. The present invention relates to the gearless type, and it particularly has for its object to provide such a differential of as few parts as possible and one possessing a minimum amount of lost motion.

Further, it is an object of the invention to adapt the mechanism disclosed in my Patents #2,050,304, issued August 11, 1936, and #2,106,946, issued February 1, 1938, and that disclosed in my application filed August 23, 1937, Ser. #160,535, to a particular type of differential such, for example, as that known in the trade as the "Thornton tandem" differential.

Further, it is an object to improve the differential of my above-mentioned application by providing means for the more ready flow of lubricant to and from the clutch faces.

Further, it is an object to provide means whereby the driven clutch members or side plates also act as grease pumps to cause grease to flow to and from the clutch faces during the time the gearing is differentiating.

Again, it is an object to combine the ring gear and the driving clutch member in a single integral unit.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which—

Fig. 1 is a central vertical section of the gearing embodying my invention.

Fig. 2 is a vertical section of one half the case on a reduced scale.

Fig. 3 is a central vertical section of the combined ring-gear and driving clutch member, the section being taken on the line 3—3 of Fig. 4.

Fig. 4 is a side elevation of the combined ring-gear and driving clutch member.

Fig. 5 is a side elevation of one of the driven clutch members or side plates.

Fig. 6 is a central vertical section on the line 6—6 of Fig. 5.

Fig. 7 is an elevation looking at the other side of the same.

Fig. 8 is an enlarged detail-developed section on the line 8—8 of Fig. 4.

Fig. 9 is an enlarged detail-developed section showing how the clutch teeth of the driving and driven clutch members engage, the driving force being applied in the direction of the arrow.

Fig. 10 is a side elevation of one of the center rings.

Fig. 11 is a side elevation of a portion of the same, looking at the side opposite that shown in Fig. 10.

Fig. 12 is a detail section on the line 12—12 of Fig. 10.

Fig. 13 is a detail section on the line 13—13 of Fig. 10.

In its general principles, and to a large extent structurally, the several elements of the present invention follow those of the patents and application aforesaid; so only a most general description thereof is deemed necessary in this specification.

In the drawings, in which like numerals of reference indicate like parts in all the figures, 1 and 2 indicate the two shafts whose rotation is to be differentiated. These shafts are grooved to receive the internal splines 5 of the respective spline-collars 3 and 4. The abutting ends of the collars 3 and 4 are turned down to provide recess 7 in which the center rings 33 and reduced web 26 lie.

A portion of the outer cylindrical faces of the collars 3 and 4 have bearing in the hubs 15 of the case, while the other portions are grooved and splined as at 6 to fit the splines 22 and grooves of the driven clutch members or side plates 8.

The plates 8 have cylindrical pockets 9 entering from the outer faces of the plates to receive the coil springs which also abut the spring-support discs 13. The inner faces of the plates 8 carry the ring flanges 12 and the clutch teeth 21, the latter cooperating with the clutch teeth 27 on the main web 25 of the combined ring-gear and driving clutch member 24. The teeth 27 lie in the spaces 23 between adjacent teeth 21 when both plates 8 are in mesh with the driving clutch member. The driving clutch member has a reduced web 26 to each side of which lies a center ring 33, the two rings 33 being held together rigidly, and to the web 26 by rivets which comprise each a body 37, shanks 38 and upset ends 39, the bodies 37 lying in holes 36 in the rings 33 while the bodies 37 lie in the holes 32 in the web 26.

The rings are also provided on the inner sides with ball pockets 40 to receive the bearing-ball members 41 which project through the annular groove 34 on the outer side of the ring, the groove 34 receiving the ring flange 12 on the adjacent side plate 8.

Bolts 42 pass through holes 31 in the webs 25 and through holes 17 in the case members to secure the parts in assembled relation.

The case comprises two sections or parts, each consisting of the bearing hub 15, side wall 14, peripheral wall 16 and peripheral flange 18, the inner corner of which is beveled as at 19 to constitute, with the adjacent corner between the web 25 and gear portion of 24, a lubricant groove.

The ring flange 12 of each driven member or plate 8 has cam notches 20 (see Figs. 5 and 6) in which the balls 41 lie.

The corners of the clutch teeth 27 and 21 are beveled as at 28 and 29, respectively, to prevent sticking and to aid lubrication, and for this purpose the inner surfaces of the spaces 23 are inclined in two planes (see Fig. 9). The edge 30 of the ring-gear-driving clutch member may also be beveled to aid lubrication.

It should be understood that the entire assembly of Fig. 1 is normally enclosed in the differential housing (not shown) which is kept supplied with gear oil or grease in the usual way.

The side plates 8 are also provided at each spring pocket 9 with bores 11 through which the oil may pass from the space between plates 8 and 13 to the space between 8 and 33 as the plates 8 move out of and into mesh with the driving member. These in and out movements of the plates 8 along the axis of the assembly cause the plates to act as oil pumps or circulators to ensure effective lubrication not only of the clutch faces but of the balls 41 and ring flanges 12.

When both clutch members 8 are in full mesh with clutch member 25 the vehicle will be moving forwardly or backwardly in a straight line.

Now when the vehicle turns say to the left, the right hand member 8 will become unmeshed from member 25 as indicated in Fig. 1 and the driving force will then take place via shaft 1, the shaft 2 being free from driving connection with member 25. When the machine straightens out again the parts will mesh once more and the driving force of member 25 will again be applied to both members 8 and both shafts 1 and 2 will be driven thereby.

A certain amount of lost motion is provided between teeth 21 and 27 to permit the cam elements 12, 20 to function properly with the balls 41, to throw out of mesh, at the required times, the respective members 8 from member 25.

From the foregoing, taken in connection with the accompanying drawings, and particularly after being familiar with my patents and application aforesaid, the operation and advantages of the present structure over the preceding ones, will be clear to those skilled in the art.

What I claim is:

1. In a differential mechanism, a two-part casing having bearing hubs, two splined collars journaled in said hubs and each adapted to receive the end of an axle member, a driven clutch member slidably mounted on each collar and rotatable therewith, a driving clutch member mounted in said casing between said driven clutch members, said driving and said driven clutch members having engaging clutch teeth, said driving and said driven clutch members having engaging cam elements, the driven clutch members having spring pockets in their outer faces, springs projected into said pockets for continuously urging said clutch members together, means limiting the separation of said driven clutch members from the driving clutch member to a predetermined distance, said driven clutch members having holes to effect communication between said spring pockets and the toothed faces of the clutch members, and means securing said driving clutch member and said casing parts together as a unit.

2. In a differential mechanism, a two-part casing having bearing hubs, two splined collars journaled in said hubs and each adapted to receive the end of an axle member, a driven clutch member slidably mounted on each collar and rotatable therewith, a combined ring-gear and driving clutch member mounted in said casing between said driven clutch members, said driving and said driven clutch members having engaging clutch teeth, said driving and said driven clutch members having engaging cam elements, the driven clutch members having spring pockets in their outer faces, springs projected into said pockets for continuously urging said clutch members together, means limiting the separation of said driven clutch members from the driving clutch member to a predetermined distance, said driven clutch members having holes to effect communication between said spring pockets and the toothed faces of the clutch members, and means securing said casing parts together as a unit.

3. In a differential mechanism, a two-part casing having bearing hubs, two splined collars journaled in said hubs and each adapted to receive the end of an axle member, a driven clutch member slidably mounted on each collar and rotatable therewith, a driving clutch member mounted in said casing between said driven clutch members, said driving and said driven clutch members having engaging clutch teeth, said driving and driven clutch members having engaging cam elements, the driven clutch members having spring pockets in their outer faces, springs in said pockets for continuously urging said clutch members together, spring engaging discs interposed between said driven clutch members and the side walls of said casing for limiting the separation of said driven clutch members from the driving clutch member to a predetermined distance, said driven clutch members having holes to effect communication between said spring pockets and the toothed faces of the clutch members, and means securing said driving clutch member and said casing parts together as a unit.

4. In a differential mechanism, a two-part casing having bearing hubs, two splined collars journaled in said hubs and each adapted to receive the end of an axle member, a driven clutch member slidably mounted on each collar and rotatable therewith, a combined ring-gear and driving clutch member mounted in said casing between said driven clutch members, said driving and said driven clutch members having engaging clutch teeth, said driving and said driven clutch members having engaging cam elements, the driven clutch members having spring pockets in their outer faces, springs in said pockets for continuously urging said clutch members together, spring engaging discs interposed between said driven clutch members and the side walls of said casing for limiting the separation of said driven clutch members from the driving clutch member to a predetermined distance, said driven clutch members having holes to effect communication between said spring pockets and the toothed faces of the clutch members, and means securing said casing parts together as a unit.

CLAYTON ERASMUS FREDERICKSON.